Patented Sept. 24, 1940

2,215,969

UNITED STATES PATENT OFFICE 2,215,969

METHOD FOR RECOVERING SULPHUR

Alfred Maxton, Heinsberg, Rhineland, Germany, assignor to North American Rayon Corporation, New York, N. Y., a corporation of Delaware No Drawing. Application November 28, 1939, Serial No. 306,529. In Germany November 17, 1938

4 Claims. (Cl. 23—224)

This invention relates to improvements in methods for recovering sulphur from waste industrial liquors.

It is an object of the invention to recover sulphur in elemental form from waste liquors in which the said sulphur is either initially present therein in colloidally or otherwise finely subdivided condition or in which the sulphur has been set free in a similar fine state of subdivision and distribution when such liquors are treated with suitable sulphur releasing agents, such as acids, for example.

It is a further object of the invention to make effective industrial use of the property possessed by particles of colloidally or otherwise finely subdivided sulphur when present in certain liquids in suspended or distributed condition of settling out and adhering to the walls of the containing vessel and of pipes, pumps and the like through which said liquids are conducted so as to form a deposit thereon under certain conditions governed for example by the nature of the material of the vessel or pipes or the lining thereof.

It is a still further object of the invention to apply this property industrially and to provide means for its utilization to the end that sulphur may be readily recovered from waste liquors by virtue of the property above recited and in either a continuous operating phase or in intermittent periodic phases of operation.

The principles underlying the invention and the modus operandi thereof are set forth in detail herewith.

If sulphur-containing solutions or substances such as freshly spun artificial silk which contain sulphur in the form of thio-carbonates, thiosulphates, thiosulphites, thiosulphides, and the like are treated with dilute acids, say mineral acids, and especially sulphuric acid, the sulphur is precipitated at least at first in a colloidal form the particles of which agglomerate or clump together very slowly or else not at all, such sulphur being therefore difficult to filter or remove by decantation. It has however been observed that such sulphur particles possess a certain stickiness or adherent property and that in time they adhere to the walls of the container holding such liquids. If liquors containing sulphur in this form are pumped through lead pipes for example, the sulphur partly settles out on the inside walls of the lead pipes and may in time effect their complete stoppage. The present invention therefore involves the utilization of this property in providing a recovery method applicable to such finely subdivided and distributed sulphur. It is therefore apparent, broadly speaking, that the invention can be practised by passing such liquors through lead or similar pipes and that the latter may be cleaned out when they become partly filled with sulphur in order to recover the latter. However, it has also been found that pipes or pumps or even other vessels made of rubber or which are interiorly lined with rubber, especially soft rubber, also manifest this adhesion phenomenon with respect to finely subdivided sulphur, but with the difference that the sulphur from time to time becomes loosened or detached from the thus constituted support. An essential condition in this case is that a relatively large surface must be presented by such vessels or pipes to the sulphur-containing solutions contained therein or conducted therethrough. It has further been found that the release or detachment of the sulphur from the rubber is greatly facilitated if the vessels or the rubber surfaces per se are subjected to a slight vibration of either permanent or intermittent duration. Any suitable means may be used for producing the required vibration. In this connection, for example, if acid solutions containing sulphur in the above recited finely distributed or colloidal state of sub-division are conducted through long lengths of rubber hose, it will be found that the liquid issuing at the outlet end contains the sulphur in a clumped-together or agglomerated condition and that the magnitude of this agglomeration depends upon the incident factors involved, e. g. the length, size, and diameter of the hose. This property is also readily manifested by the fact that the turbidity of the initial solution has become reduced to a fraction of its original condition, the sulphur then issuing in the form of more or less coarse particles and lumps so that it can be readily separated from the liquid by filtration or even by mere decantation.

What is claimed is:

1. In a method of clarifying liquids containing sulphur particles of such fineness as to be normally unfiltrable therefrom, the step of passing said lquids into contact with continuous solid surfaces of substantially unbroken area of a material having the property of causing the sulphur particles to be deposited thereon in an agglomerated condition and continuing said passage until said liquids are substantially clarified.

2. The method as set forth in claim 1, wherein the surfaces of extended area are composed of rubber.

3. The method as set forth in claim 1, wherein the surfaces of extended area are composed of lead.

4. In a method of clarifying liquids containing sulphur particles of such fineness as to be normally unfiltrable therefrom, the step of passing said liquids into contact with continuous solid surfaces of substantially unbroken area of a material having the property of causing the sulphur particles to be deposited thereon in an agglomerated condition and continuing said passage until said liquids are substantially clarified and thereafter vibrating the said surfaces to detach the agglomerated sulphur therefrom.

ALFRED MAXTON.